United States Patent
Xiang et al.

(10) Patent No.: US 11,157,195 B2
(45) Date of Patent: Oct. 26, 2021

(54) RESUMABLE REPLICA RESYNCHRONIZATION

(71) Applicant: VMware, Inc., Palo Alto, CA (US)

(72) Inventors: Enning Xiang, San Jose, CA (US);
Eric Knauft, San Francisco, CA (US);
Pascal Renauld, Palo Alto, CA (US)

(73) Assignee: VMware, Inc., Palo Alto, CA (US)

( * ) Notice: Subject to any disclaimer, the term of this patent is extended or adjusted under 35 U.S.C. 154(b) by 51 days.

(21) Appl. No.: 16/445,649

(22) Filed: Jun. 19, 2019

(65) Prior Publication Data

US 2019/0303013 A1  Oct. 3, 2019

Related U.S. Application Data

(63) Continuation of application No. 15/223,337, filed on Jul. 29, 2016, now Pat. No. 10,365,852.

(51) Int. Cl.
*G06F 3/06* (2006.01)

(52) U.S. Cl.
CPC .............. *G06F 3/065* (2013.01); *G06F 3/067* (2013.01); *G06F 3/0617* (2013.01); *G06F 3/0619* (2013.01)

(58) Field of Classification Search
None
See application file for complete search history.

(56) References Cited

U.S. PATENT DOCUMENTS

| | | | |
|---|---|---|---|
| 7,007,044 B1 | 2/2006 | Rafert et al. | |
| 7,039,661 B1 * | 5/2006 | Ranade | G06F 16/184 707/610 |
| 10,365,852 B2 | 7/2019 | Xiang et al. | |
| 2003/0177321 A1 * | 9/2003 | Watanabe | G06F 11/2082 711/161 |
| 2005/0114410 A1 | 5/2005 | Fujibayashi | |
| 2007/0250672 A1 | 10/2007 | Stroberger et al. | |
| 2008/0065843 A1 * | 3/2008 | Bartfai | G06F 11/2069 711/162 |
| 2010/0169596 A1 | 7/2010 | Wada | |

(Continued)

OTHER PUBLICATIONS

Reisner et al. (Replicated Storage with Shared Disk Semantics (Year: 2007).*

*Primary Examiner* — Ryan Bertram
*Assistant Examiner* — Trang K Ta
(74) *Attorney, Agent, or Firm* — Fish & Richardson P.C.

(57) ABSTRACT

Systems and techniques are described for transferring data. A described technique includes determining that a first replica of an object stored at a first host has become available to a distributed storage system after previously being unavailable to the distributed storage system. The object includes a range of memory addresses at which data of the object is stored. In response to determining that the first replica has become available, resyncing data for the first replica is obtained. The resyncing data indicates whether each range of memory addresses is synchronized at the first replica with other replicas of the object. Tracking data for the first replica is obtained. The tracking data indicates whether data stored at the range of memory addresses of the object has been modified at a second replica while the first replica was unavailable. The resyncing data is updated based on the tracking data.

20 Claims, 4 Drawing Sheets

(56) References Cited

U.S. PATENT DOCUMENTS

| | | | |
|---|---|---|---|
| 2015/0067282 A1* | 3/2015 | Kobayashi | G06F 11/2074 |
| | | | 711/158 |
| 2017/0177658 A1* | 6/2017 | Lee | G06F 16/273 |
| 2017/0235805 A1* | 8/2017 | Shetty | G06F 16/178 |
| | | | 707/634 |
| 2017/0300244 A1* | 10/2017 | Crawford | G06F 3/067 |
| 2018/0032257 A1 | 2/2018 | Xiang et al. | |

* cited by examiner

RESUMABLE REPLICA RESYNCHRONIZATION

CROSS REFERENCE TO RELATED APPLICATION

This application is a continuation application of U.S. patent application Ser. No. 15/223,337, filed on Jul. 29, 2016, which is incorporated herein in its entirety.

BACKGROUND

This document relates to data synchronization in distributed storage systems.

In distributed storage systems, replication is important for availability and performance. When a replica of an object is disconnected from the distributed storage system, e.g., for maintenance or due to a network error, the replica will need to be resynchronized when the replica is reconnected to copy over any updates or modifications that occurred to the object while the replica was disconnected. Resynchronization can be a time consuming process and it is possible that the replica may be disconnected and reconnected to the system during the resynchronization process.

BRIEF DESCRIPTION OF THE DRAWINGS

Like reference numbers and designations in the various drawings indicate like elements.

DETAILED DESCRIPTION

Figure 1:
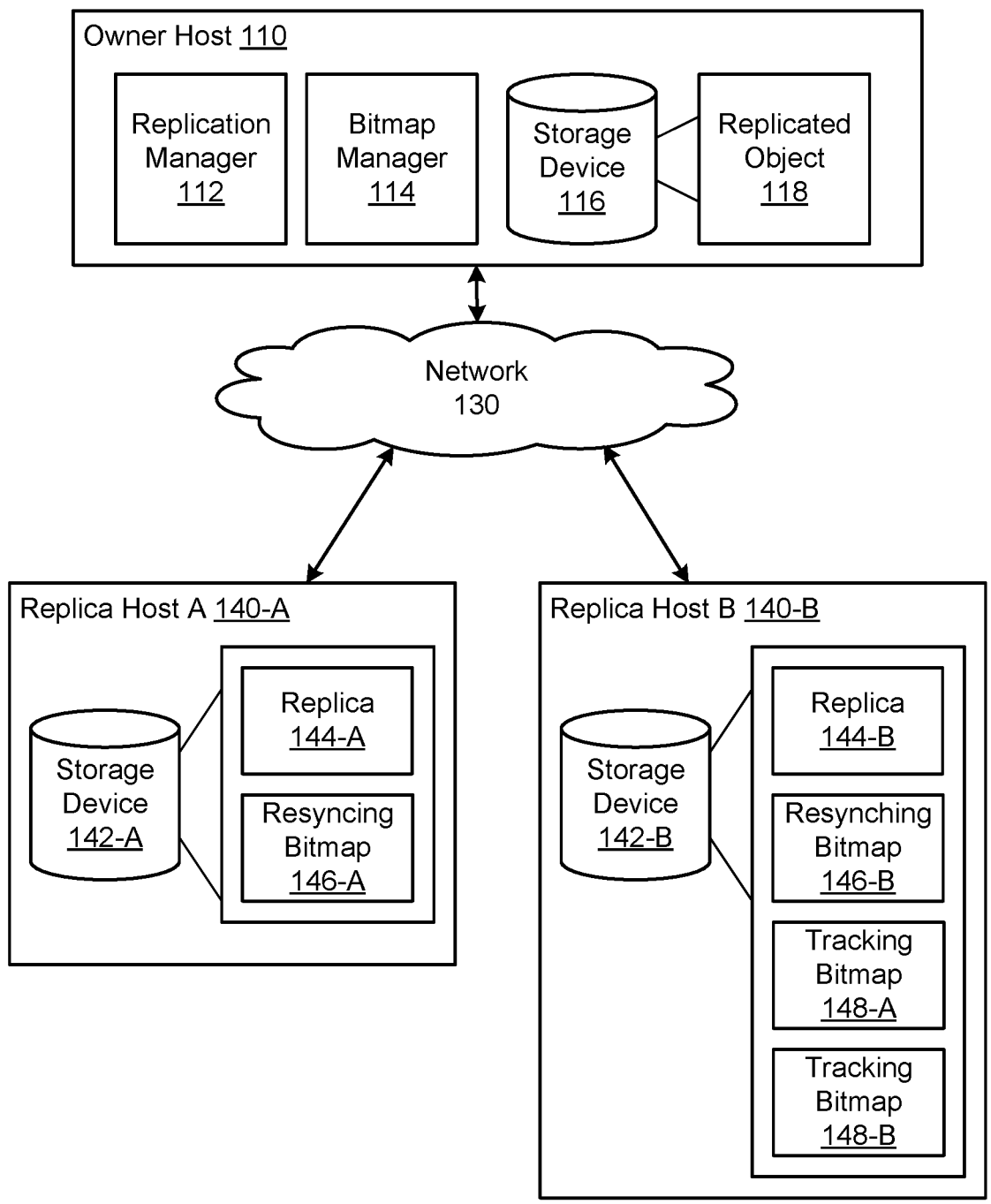
FIG. 1 shows an example environment in which data of replicas is transferred between data storage devices.

This document generally describes techniques for synchronizing data in distributed storage systems. In a distributed storage system, an object can be replicated across multiple hosts. An object can include a set of data, code, or applications. The object can include data stored in multiple ranges of one or more memory addresses. A replica of an object can include data and metadata for the object. Each replica of an object can include data of the object stored in the same multiple ranges of memory addresses as the object.

When a particular replica of an object becomes unavailable to the distributed storage system, e.g., due to its host going offline or the data storage device that stores the replica undergoing maintenance, the replica may become unsynchronized with other replicas of the object. For example, an application may write data to data blocks of the object while the particular replica is unavailable. The data may also be written to each replica that is available to keep the replicas synchronized. However, as the particular replica is unavailable, the particular replica may not receive the data and may become unsynchronized.

When the particular replica becomes available again, the particular replica can be resynchronized with the other replicas. For example, data of the object or data of one of the other replicas can be copied to the particular replica. However, resynchronization can be a time consuming process and it is possible that the particular replica may become unavailable again during the resynchronization process.

Techniques described herein can improve the speed at which the particular replica is resynchronized by avoiding copying data blocks of another replica to the particular replica if the data block was copied during the resynchronization process before the particular replica became unavailable during the resynchronization process. For example, while the particular replica was unavailable initially, several data blocks of the other replicas may have been modified. When the particular replica became available after the initial unavailability, a portion of the modified data blocks may have been copied to the particular replica before the particular replica became unavailable again. The techniques described herein can avoid copying that portion of data blocks to the particular replica when the particular replica becomes available again unless the data blocks were modified again during the second unavailability. Thus, the resynchronization can resume and be limited to data blocks of the particular replica that are not synchronized with the other replicas of the object without copying data that has already been synchronized.

Data structures can be used to keep track of which data blocks of the particular replica are not synchronized with the other replicas of the object. In some implementations, the data structures are bitmaps. In some implementations, the data structures may be databases, tables, lists, or other appropriate data structures. A bitmap for a replica of an object can include a map of bits. For example, the bitmap for the replica can include a respective bit for each range of memory addresses of the object. Each bit can indicate whether its respective range of memory addresses is synchronized for the replica. For example, a set bit may indicate that the respective range of memory addresses for the replica that correspond to the set bit are unsynchronized, e.g., that the data stored at the memory addresses at the replica of the object is not the same as the data stored at the memory addresses at the object and/or at other replicas of the same object. An unset bit may indicate that its respective range of memory addresses of the replica are synchronized with the other replicas.

Multiple bitmaps can be used to track the synchronization of data between multiple replicas of an object. For example, a resyncing bitmap for a particular replica can include a map of bits. For example, the bitmap for the replica can include a respective bit for each range of memory addresses of the object. Each bit of the resyncing bitmap can indicate whether its respective range of memory addresses of the particular replica is synchronized with the object and/or other replicas of the same object. During resynchronization, the bits of the resyncing bitmap can be updated as the particular replica is resynchronized with the other replicas. For example, if data of a range of memory addresses that corresponds to a particular bit is copied to the particular replica during resynchronization, the bit can be updated, e.g., unset, to indicate that the range memory addresses for the particular replica is synchronized with the other replicas.

When the particular replica becomes unavailable, a tracking bitmap can be generated and maintained for the particular replica at one or more hosts that include a replica of the same object. The tracking bitmap can include a map of bits. For example, the tracking bitmap for a replica can include a respective bit for each range of memory addresses of the object. Each bit of the tracking bitmap for a replica can indicate whether data stored at the bit's respective range of memory addresses has been modified at that replica while the particular replica is unavailable. For example, the tracking bitmap(s) can be updated based on data of the object being modified at the object and/or at each available replica while the particular replica is unavailable. In a particular example, if the data stored at the memory addresses of the replica that correspond to a particular bit of the tracking bitmap are modified, the bit can be set.

When the particular replica becomes available, the resyncing bitmap can be updated based on the tracking bitmap(s). For example, if a bit of a tracking bitmap was set while the particular replica was unavailable, the same bit of the resyncing bitmap can be set to indicate that the corresponding range of memory addresses of the particular replica is not synchronized with the other replicas. The bits of the resyncing bitmap that correspond to memory addresses that were not modified while the particular replica was unavailable are not modified, e.g., the bits are not set or unset. In this way, when resynchronization resumes, only the ranges of memory addresses that correspond to the bits of the resyncing bitmap that were not unset during the previous resynchronization and the bits that were set in the tracking bitmap are synchronized.

Particular embodiments of the subject matter described in this document can be implemented so as to realize one or more of the following advantages. By avoiding copying the same data from one replica to another during a resynchronization process, the resynchronization process can be completed more quickly and using fewer resources. In addition, less demand is placed on resources of a distributed storage system that stores the replicas. For example, fewer CPU cycles are used and less network bandwidth is consumed in copying data blocks during the resynchronization process, resulting in better performance of the CPUs and network resources.

FIG. 1 shows an example environment 100 in which data of replicas is transferred between data storage devices. The example environment 100 includes an owner host 110 and two replica hosts 140-A and 140-B. Other examples can include different numbers of owner hosts and replica hosts. The owner host 110 and the replica hosts 140-A and 140-B can communicate data between each other over a network 130, e.g., a local area network (LAN), a wide area network (WAN), the Internet, a mobile network, or a combination thereof.

The owner host 110 is a computing host that manages the replication of a particular replicated object. For example, the owner host 110 may be a system of one or more computers that manages the replication of a replicated object 118 stored in a data storage device 116. The replica hosts 140-A and 140-B can also store replicas 144-A and 144-B of the object 118 in respective data storage devices 142-A and 142-B. Although each host is illustrated as hosting a single replica of a single object, each host can store multiple replicas of multiple objects. In addition, the replica hosts 140-A and 140-B can be owner hosts for replicated objects for which they manage the replication.

The example owner host 110 includes a replication manager 112, a bitmap manager 114, and the data storage device 116. Although not shown, each replica host 140-A and 140-B can include similar components. The replication manager 112 can coordinate the replication and synchronization of the replicated object 118 between the data storage devices 116, 142-A, and 142-B. For example, the replication manager 112 can initiate and manage the copying of the replicated object 118 from the data storage device 116 of the owner host 110 to the data storage devices 142-A and 142-B, from the data storage devices 142-A and 142-B to the data storage device 116, and between the data storage devices 142-A and 142-B.

The replicated object 118 can be used by an application, e.g., that is hosted by one or more other computers, during normal operation of the application. For example, the replicated object 118 may store data that is used by a particular application. The object can include data stored in multiple ranges of one or more memory addresses of the data storage device 116. In general, the particular application may read data from, and write data to, its object stored in the data storage device 116 of the owner host 110. When the replicated object 118 is modified, the replication manager 112 can synchronize the changes to the replicas 144-A and 144-B stored in the data storage devices 142-A and/or 142-B if the replica 144-A and 144-B are available, e.g., if the replica hosts 140-A and 140-B are available. For example, if data for the replicated object 118 stored in a particular range of memory addresses in the data storage device 116 is modified, the replication manager 112 can copy the data to the same range of memory addresses of the data storage devices 142-A and 142-B, if available.

In another example, if the owner host 110 is unavailable, a new owner host may be elected for the replicated object 118. For example, a coordinator host for a distributed storage system that includes the owner host 110 and the replica hosts 140-A and 140-B may select one of the replica hosts 140-A or 140-B to be the owner host for the replicated object 118. While a replica host 140-A or 140-B is the owner host, the application(s) may read data from, and write data to, the replicas of the objects stored at the replica host 140-A or 140-B. The replica host 140-A or 140-B may continue being the owner host for the replicated object 118 even after the owner host 110 becomes available again.

During resynchronization, the replication manager 112 can use one or more data structures, e.g., one or more bitmaps, to determine what data to copy from a synchronized replica to a replica that was unavailable for a period of time. For example, the bitmap manager 114 can create and maintain a resyncing bitmap 146 for each replica at each replica host 140-A and 140-B. The bitmap manager 114 may create the resyncing bitmaps 146-A and 146-B in response to the respective replicas 144-A and 144B becoming available after some time of unavailability. The owner host 110 can also include a resyncing bitmap for the replicated object 118, e.g., of the replicated object has become available again after being unavailable for some time.

The resyncing bitmaps 146-A and 146-B for a replica 144-A and 144-B can include a map of bits. For example, the resyncing bitmaps 146-A and 146-B can each include a respective bit for each range of memory addresses of the replicated object 118. Each bit of the resyncing bitmap 142-A for the replica 144-A can indicate that the bit's respective range of memory addresses of the replica 144-A is synchronized with other replicas of the replicated object 118, e.g., the replicated object 118 and/or the replica 144-B. Similarly, each bit of the resyncing bitmap 142-B for the replica 144-B can indicate whether the bit's respective range of memory addresses of the replica 144-B is synchronized with other replicas of the replicated object 118, e.g., the object 118 and the replica 144-A. In some implementations, a set bit indicates that its respective range of memory addresses is not synchronized with the other replicas and an unset bit indicates that its respective range of memory addresses is synchronized the other replicas.

During resynchronization of the replica 144-A, the bitmap manager 114 can update the bits of the resyncing bitmap 146-A as the replica 144-A is resynchronized with the other replicas. For example, if data of a range of memory addresses that corresponds to a particular bit is copied to the replica 144-A during resynchronization, the bitmap manager 114 can update the bit, e.g., unset the bit, to indicate that the range memory addresses for the replica 144-A is synchronized with the other replicas. The bitmap manager 114 can update a bit of the resyncing bitmap 146-A by sending a request to the replica host 140-A. In turn, the replica host 140-A can update the resyncing bitmap 146-A.

The replica host 140-B also includes a tracking bitmap 148-A. When a replica of an object becomes unavailable, the bitmap manager 114 can create and maintain one or more tracking bitmaps in response to the replica becoming unavailable. In this example, the bitmap manager 114 has created a tracking bitmap 148-A in response to the replica 144-A becoming unavailable, e.g., due to the replica host 140-A becoming unavailable. The bitmap manager 114 may store the tracking bitmap 148-A at the replica host 140-B, e.g., in the data storage device 142-B. The bitmap manager 114 may also create and maintain a tracking bitmap at the owner host 110. For example, the bitmap manager 114 may create and maintain a tracking bitmap at each host that hosts a replica of the same object 118 as the replica 144-A that is unavailable. If the replica host 140-A stores multiple replicas, the bitmap manager 114 can create a respective tracking bitmap for each replica at each host that stores a replica of the same object.

The tracking bitmap 148-A can include a map of bits. For example, the tracking bitmap 148-A can include a respective bit for each range of memory addresses of the replica 144-A. The range of memory addresses for which the tracking bitmap 148-A includes a bit can include each range of memory addresses of the replicated object 118. Each bit of the tracking bitmap 148-A can indicate whether data stored at the bit's respective range of memory addresses of the object has been modified at the replica 144-B while the replica 144-A is unavailable, e.g., since the time that the replica 144-A became unavailable. For example, the bitmap manager 114 can update the tracking bitmap 148-A based on data of the replica 144-B being modified while the replica 144-A is unavailable. In a particular example, an application may write data to a data block located within a range of memory addresses of the replica 118. In turn, the replication manager 112 may synchronize the data to all available replicas, e.g., the replica 144-B. As the replica 144-A is unavailable, the replication manager 112 may not be able to synchronize the data with the replica 144-A. Instead, the bitmap manager 114 may update each tracking bitmap for the replica 144-A to indicate that the range of memory addresses has been modified at the other replicas. For example, the bitmap manager 114 may send a request to the replica host 140-B to update the bit for the range of memory addresses at the tracking bitmap 148-A. In turn, the replica host 140-B may update the bit to indicate that its respective range of memory addresses has been modified.

When the replica 144-A becomes available again, the replication manager 112 can resynchronize the replica 144-A with the replicated object 118 and the replica 144-B using the resyncing bitmap 146-A for the replica 144-A. Prior to using the resyncing bitmap 146 to resynchronize the replica 144-A, the bitmap manager 114 can update the resyncing bitmap 146-A based on the tracking bitmap 148-A. If the replica 144-A was synchronized with the other replicas 118 and 144-B when the replica 144-A became unavailable, each bit of the resyncing bitmap 146-A should indicate that its respective range of memory addresses is synchronized. For example, each bit of the resyncing bitmap 146-A may be unset. To update the resyncing bitmap 146-A using the tracking bitmap 148-A, the bitmap manager 114 may identify each bit of the tracking bitmap 148-A that indicates that its respective range of memory addresses of the replica 144-B was modified while the replica 144-A was unavailable. The bitmap manager 114 may then update the bit of the resyncing bitmap 146 that corresponds to each identified bit of the tracking bitmap 148-A to indicate that the range memory addresses that correspond to each bit are not synchronized with the replica 144-B. In this way, the bits of the resyncing bitmap 146-A indicate which range(s) of memory addresses of the replica 144-A should be resynchronized.

During resynchronization, the replication manager 112 can copy data from the replicated object 118 or the replica 144-B to the replica 144-A based on the updated resyncing bitmap 146-A, e.g., rather than copying all of the data of the replicated object 118 or the replica 144-B to the replica 144-A. For example, the replication manager 112 may identify each bit of the updated resyncing bitmap 146-A that indicates that its respective range of memory addresses is not synchronized and copy data for each range of memory addresses that is not synchronized from the replicated object 118 or 144-B to the replica 144-A. As the data is copied, the replication manager 112 can interact with the bitmap manager 114 to update the resyncing bitmap 146-A based on the copied data. For example, if the data for a range of memory addresses has been copied to the replica 144-A, the bitmap manager 114 can send a request to the replica host 140-A to update the bit of the resyncing bitmap 146-A for the range of memory addresses. In turn, the replica host 140-A can update the bit to indicate that the bit's respective range of memory addresses of the replica 144-A is synchronized.

If the replica 144-A becomes unavailable again during the resynchronization process, the bitmap manager 114 can create a new tracking bitmap 148-B to track the range(s) of memory addresses of the replica 144-B that are modified while the replica 144-A is unavailable this time. In another example, the bitmap manager 114 may clear the existing tracking bitmap 148-B and start over with tracking ranges of memory addresses that are modified while the replica 144-A is unavailable. In these examples, the resyncing bitmap 146-A may have one or more bits that each indicate that the bit's respective range of memory addresses are not synchronized as the resynchronization process was not completed. When the replica 144-A becomes available again, the bitmap manager 114 may update the resyncing bitmap 146-A using the new tracking bitmap 148-B (or the cleared and then updated tracking bitmap). For example, the bitmap manager 114 may identify each bit of the new tracking bitmap 148-B that indicates that its corresponding range of memory addresses of the replica 144-B was modified while the replica 144-A was unavailable. The bitmap manager 114 may then update the bit of the resyncing bitmap 146-A that corresponds to each identified bit of the tracking bitmap 148 to indicate that the range memory addresses that corresponds to each bit are not synchronized with the replica 144-B. If an identified bit of the resyncing bitmap 146-A already indicated that its respective range of memory addresses was not synchronized, the bit may be left unchanged. The replication manager 112 can then use the updated resyncing bitmap 146-A to copy data from the replicated object 118 or the replica 144-B to the replica 144-A.

As multiple tacking bitmaps may be created and maintained during resynchronization processes for the replica, each tracking bitmap can be associated with a unique identifier. In this way, the replication manager 112 can identify the appropriate tracking bitmap(s) to use when updating the resyncing bitmap for the replica. For example, the replication manager 112 may store, for the replica that has become unavailable, the unique identifier of the tracking bitmap(s) created in response to the replica becoming unavailable. In some implementations, the unique identifier for a tracking bitmap corresponds to a last operation sequence number for the replicated object 118 before the replica became unavailable. For example, the last operation sequence number may correspond to a last write operation that was performed on the replicated object and synchronized to the replicas 144-A and 144-B before the replica became unavailable. The bitmap manager 114 can associate the unique identifier, e.g., the sequence number, with the tracking bitmaps created at each host. When the replica becomes available again, the bitmap manager 114 can identify the appropriate tracking bitmap(s) based on the unique identifier.

Figure 2:
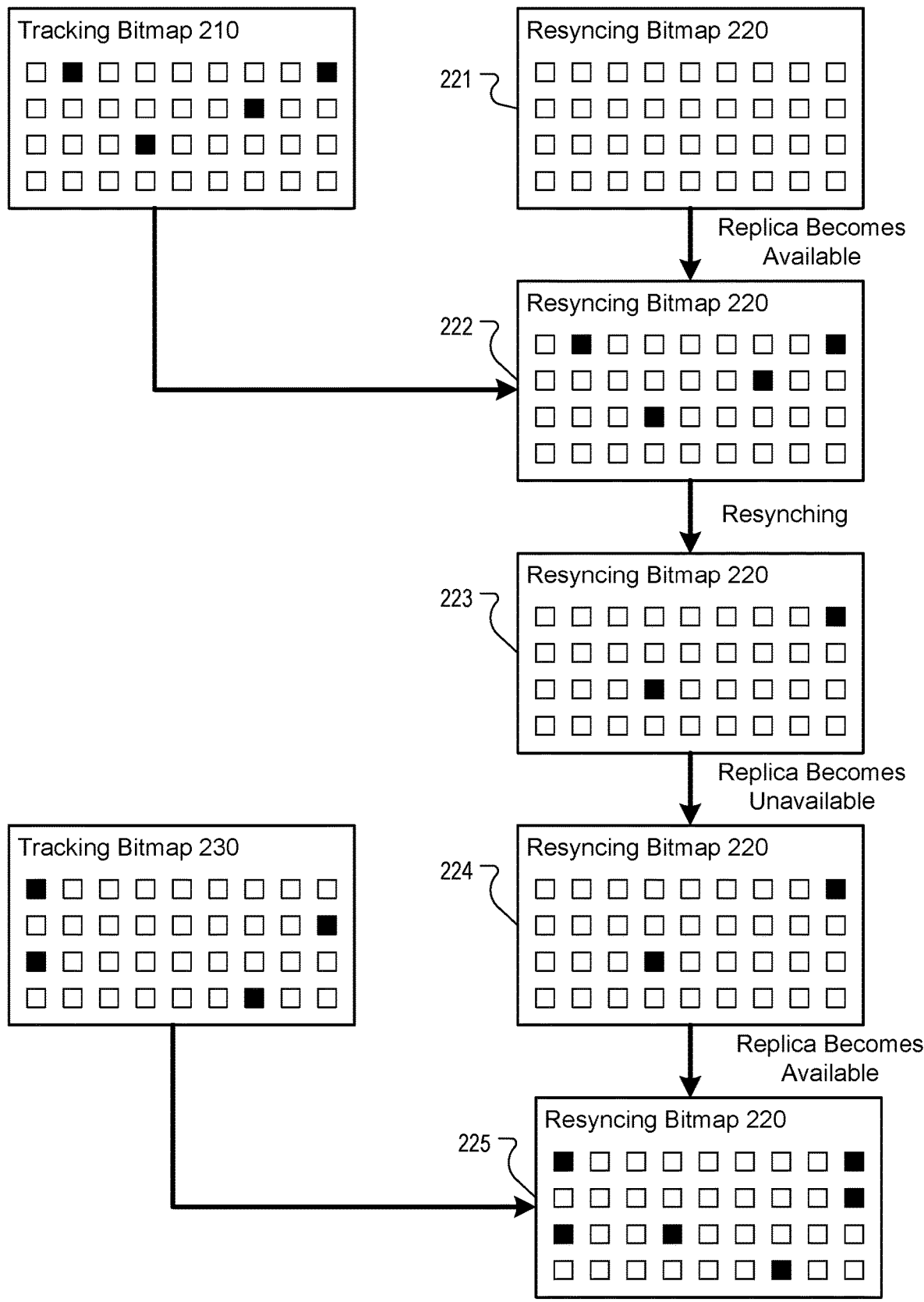
FIG. 2 shows an example resyncing bitmap and tracking bitmaps during resynchronization.

FIG. 2 shows an example resyncing bitmap 220 and tracking bitmaps 210 and 230 during resynchronization. The resyncing bitmap 220 can be generated and maintained for a particular replica of an object that is stored at a host. Each tracking bitmap 210 and 230 may be generated in response to the particular replica becoming unavailable, as described in more detail below. The resyncing bitmap 220 and the tracking bitmaps 210 and 230 each includes a set of 36 bits represented by the 36 squares within each bitmap 210, 220, and 230. The resyncing bitmap 220 and the tracking bitmaps 210 and 230 includes a respective bit for each range of memory addresses at which data for the object is stored.

In this example, a bit represented by a white square in the resyncing bitmap 220 indicates that the bit's respective memory addresses of the particular replica are synchronized with the object and/or other replicas of the object. A bit represented by a black square in the resyncing bitmap 220 indicates that the bit's respective memory addresses of the particular replica are not synchronized with the object and/or other replicas of the object. Similarly, a bit represented by a white square in the tracking bitmaps 210 and 230 indicates that data stored at another replica different from the particular replica and at the bit's respective memory addresses has not been modified while the particular replica was unavailable. A bit represented by a black square in the tracking bitmaps 210 and 230 indicates that data stored at another replica different from the particular replica and at the bit's respective memory addresses has been modified while the particular replica was unavailable.

A first view 221 of the resyncing bitmap 220 indicates that the data of the particular replica 220 is completely synchronized with the object and/or other replicas of the object. For example, each square of the resyncing bitmap in view 221 is white. When the particular replica becomes unavailable, the tracking bitmap 210 may be generated. For example, the tracking bitmap 210 may be generated and stored at a different host than the host that stores the particular replica. While the particular replica is unavailable to receive updates to the object's data, the tracking bitmap 210 can be updated to indicate which ranges of memory addresses have been modified at another replica, e.g., a replica stored at the different host. For example, if the data stored at a particular bit's respective range of memory addresses is modified at the other replica while the particular replica is unavailable, the particular bit of the tracking bitmap 210 can be updated to indicate the modification. In this example, the data at four ranges of memory addresses of the other replica was modified while the particular replica was unavailable, as represented by the four black squares in the tracking bitmap 210.

When the particular replica becomes available again, the resyncing bitmap 220 can be updated based on the tracking bitmap 210. A second view 222 of the resyncing bitmap 220 shows the resyncing bitmap 220 after this update. The updating can include identifying each bit of the tracking bitmap 210 that indicates that its respective range of memory addresses has been modified. For each identified bit, the corresponding bit of the resyncing bitmap 220 is updated to indicate that the bit's range of memory addresses of the particular replica (the same range as the tracking bitmap 210) is not synchronized with the object and/or other replicas of the object. As shown in the second view 222, the resyncing bitmap 220 matches the tracking bitmap 210 after the update.

While the particular replica is available again, the resyncing bitmap 220 can be used to resynchronize the particular replica with the object and/or other replicas of the object. For example, data stored at the respective memory addresses for each bit that is represented by a black square can be copied from the other replica (or from the object) to the particular replica. Once the data for a bit represented by a black square has been copied, the bit can be updated to indicate that the data stored at the bit's respective range of memory addresses of the particular replica is synchronized with the object and/or other replicas of the object. For example, a third view 213 of the resyncing bitmap 220 includes only two black squares. In this example, the data for two of the squares has been synchronized at the particular replica, while the data for two of the squares has not yet been synchronized.

While the particular replica is being resynchronized, the particular replica may become unavailable again, preventing the data of the respective ranges of memory addresses for the two bits that are represented by black squares from being synchronized at the particular replica. In response to the particular replica becoming unavailable again, the resyncing bitmap 220 may be stored, e.g., at the host that stores the particular replica. As shown in a fourth view 224, the stored resyncing bitmap 220 can indicate the progress of the resynchronization when the particular replica became unavailable. For example, the stored resyncing bitmap 220 includes a black square for only those bits that correspond to a range of memory addresses that were not synchronized before the replica became unavailable again.

The second tracking bitmap 230 may also be generated in response to particular replica becoming unavailable again. The tracking bitmap 230 may be generated and stored at a different host than the host that stores the particular replica. While the particular replica is unavailable to receive updates to the object's data, the tracking bitmap 230 can be updated to indicate which ranges of memory addresses have been modified at another replica, e.g., a replica stored at the different host.

When the particular replica becomes available again, the resyncing bitmap 220 can be updated based on the tracking bitmap 230. A fifth view 225 of the resyncing bitmap 220 shows the resyncing bitmap 220 after this update. The updating can include identifying each bit of the tracking bitmap 230 that indicates that its respective range of memory addresses has been modified. For each identified bit, the corresponding bit of the resyncing bitmap 220 is updated to indicate that the range of memory addresses of the particular replica (the same range as the tracking bitmap 210) that correspond the bit is not synchronized with the object and/or other replicas of the object.

As shown in the fifth view 225, the resyncing bitmap 220 indicates that the two ranges of memory addresses that were not synchronized before the particular replica became unavailable for the second time still need to be synchronized. In addition, the resyncing bitmap 220 indicates that the four ranges of memory addresses that were modified during the second unavailability as indicated by the tracking bitmap 230 need to be synchronized.

Resynchronization can continue for the particular replica based on the updated resyncing bitmap 220 shown in the fifth view 225. For example, the data stored at the range of memory addresses that correspond to the six bits represented by black squares may be copied from the object or another replica of the object to the particular replica. In this way, the data that was synchronized after the first unavailability, but before the second unavailability, is not copied again to the particular replica.

Figure 3:
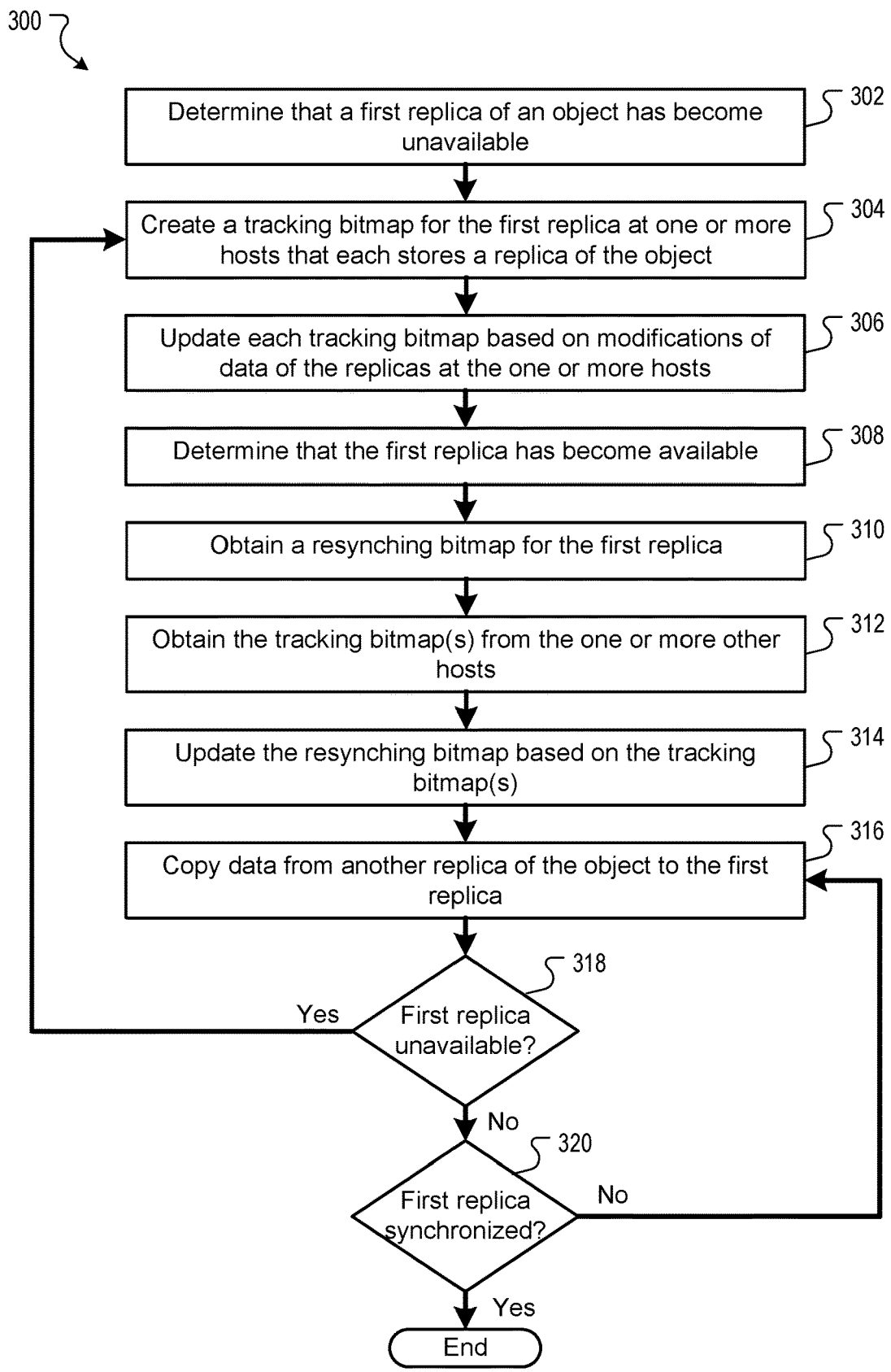
FIG. 3 is a flow chart of an example technique for synchronizing a replica.

FIG. 3 is a flow chart of an example technique 300 for synchronizing a replica. The example technique 300 is performed by a system of one or more computers. For example, the technique 300 may be performed by the owner host 110 of FIG. 1.

The system determines that a first replica of an object has become unavailable (302). For example, the object may be replicated at multiple different hosts in a distributed storage system. Each host may store a replica of the object. A first host that stores the first replica may become unavailable to the distributed storage system, e.g., for maintenance or due to a network error.

The system creates a tracking bitmap for the first replica at one or more hosts that each store a replica of the object (304). For example, the first replica and the replica stored at each of the one or more hosts may be replicas of the same object. The system may store a tracking bitmap each host that stores a replica of this object. As described above, a tracking bitmap can include a map of bits. The map of bits can include a respective bit for each range of memory addresses of the object. Each bit may indicate whether data stored at its respective range of one or more memory addresses has been modified while the first replica is unavailable.

In some implementations, the system associates a unique identifier with the tracking bitmaps. For example, the unique identifier for the tracking bitmaps can correspond to a last operation sequence number for the object before the first replica became unavailable. For example, the last operation sequence number may correspond to a last write operation that was performed on the object and synchronized to the replicas before the first replica became unavailable. In this example, the unique identifier for each tracking bitmap created in response to the first replica becoming unavailable this time can be the same. This allows the system to identify the appropriate tracking bitmaps, as described below.

The system updates each tracking bitmap based on modifications of data of the replicas stored at the one or more hosts (306). When data for a particular range of memory addresses of the object is modified, the data may be transmitted to each available host that stores a replica of the object. Each host may update its replica using the data. As the data of the replicas has been modified, the system can update each tracking bitmap to indicate that the data stored at the range of memory addresses has been modified while the first replica is unavailable. For example, the system may set the respective bit for the range of memory addresses of each tracking bitmap. The system can update the tracking bitmaps each time data of the object and the replicas is modified while the first replica is unavailable.

The system determines that the first replica has become available (308). For example, the first host that stores the first replica may become available to the distributed storage system after maintenance is completed or a network issue is resolved.

The system obtains a resyncing bitmap for the first replica (310). The resyncing bitmap can be stored at the first host that also stored the first replica. The resyncing bitmap can include a map of bits. For example, the resyncing bitmap for the first replica can include a respective bit for each range of memory addresses of the object. Each bit of the resyncing bitmap can indicate whether its respective range of memory addresses of the first replica is synchronized with the object and/or other replicas of the object. The system can obtain the resyncing bitmap from the first host in response to determining that the first replica is available.

The system obtains the tracking bitmaps from the one or more other hosts (312). For example, the system may request the tracking bitmap from each host at which a tacking bitmap was stored for the first replica in response to determining that the first replica is available. To identify the correct tracking bitmaps, the system may provide, with the request for the tracking bitmaps, the unique identifier for the tracking bitmaps. In turn, each host can identify its tracking bitmap using the unique identifier and transmit the tracking bitmap to the system.

The system updates the resyncing bitmap for the first replica using one or more of the tracking bitmaps (314). To update the resyncing bitmap, the system may identify in a tracking bitmap each bit that indicates that data stored at its respective range of memory addresses has been modified while the first replica was unavailable. For example, the system may identify each bit that is set in the tracking bitmap. For each identified bit, the system may update the same bit of the resyncing bitmap to indicate that the data stored in the bit's respective range of memory addresses is not synchronized with the object and/or the other replicas. For example, the system may send a request to the first host to set each bit of the resyncing bitmap that matches an identified bit of the tracking bitmap that indicates its data has been modified. In turn, the first host may set each bit identified in the request.

The system copies data from the object or from another replica based on the updated resyncing bitmap (316). For example, the system may check each bit of the resyncing bitmap to determine whether the bit indicates that its respective range of memory addresses should be synchronized in a sequence. For each bit that indicates that its respective range of memory addresses should be synchronized in a sequence, the system may copy the data for the bit's respective range of memory addresses from the object or another replica to the first replica. In addition, the system updates the resyncing bitmap based on the copying. For example, when the data stored in the respective range of memory addresses for a particular bit has been copied to the first replica, the system can update the particular bit to indicate that the range of memory addresses that correspond to the particular bit have been synchronized.

The system determines whether the first replica has become unavailable again during resynchronization (318). If so, the system returns to operation 304 at which the system creates another tracking bitmap for the first replica. The system may also store the resyncing bitmap so that the progress of the resyncing can be maintained. For example, the resyncing bitmap indicates which ranges of memory addresses were modified during the previous unavailability of the first replica, but that have not yet been synchronized.

If the first replica is available, the system determines whether the first replica is synchronized (320). If so, the process 300 can end. Before ending, the system can delete each tracking bitmap and/or the resyncing bitmap.

If the first replica is not synchronized, the system returns to operation 316 and continues resynchronizing the first replica until either the data for each bit that indicates that its corresponding range of memory addresses should be synchronized has been synchronized or the first replica becomes unavailable again.

Figure 4:
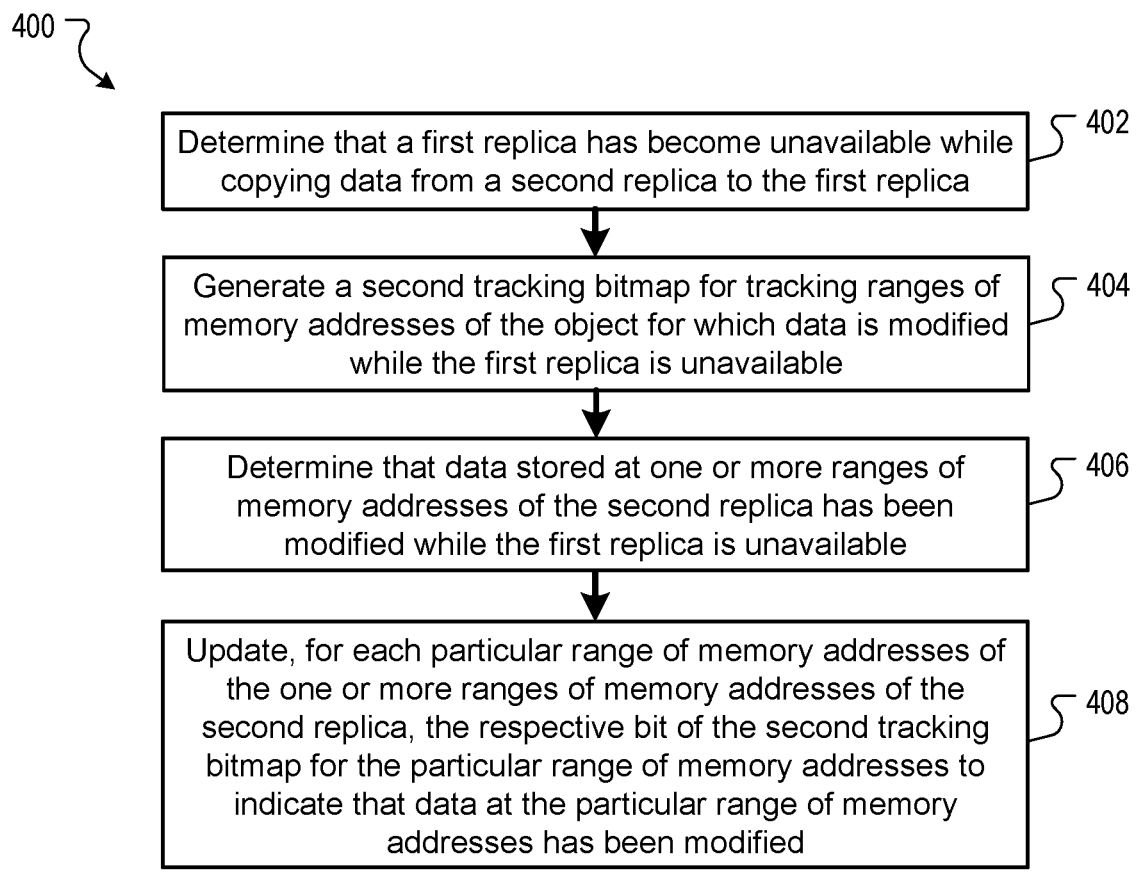
FIG. 4 is a flow chart of an example technique for generating and updating a tracking bitmap.

FIG. 4 is a flow chart of an example technique 400 for generating and updating a tracking bitmap. The example technique 400 is performed by a system of one or more computers. For example, the technique 400 may be performed by the owner host 110 of FIG. 1.

The system determines that a first replica has become unavailable while copying data from a second replica to the first replica (402). For example, the first replica and the second replica may be replicas of the same object. The first replica may have been unavailable for some time and the data of the first replica may have become unsynchronized with data of the object. To resynchronize the first replica, the system may have generated and used a resyncing bitmap to determine which ranges of memory addresses of the first replica are not synchronized. The resyncing bitmap may be based on a first tracking bitmap that was generated and updated in response to the first replica becoming available, as described above with reference to FIG. 3. Using the resyncing bitmap, the system can copy data from the second replica to the first replica to resynchronize the first replica with the object. During this resynchronization, the first replica may become unavailable again.

The system generates a second tracking bitmap for tacking ranges of memory addresses of the object for which data is modified while the first replica is unavailable (404). For example, the system may generate and store a second tracking bitmap at the host of the second replica.

The system determines that data stored at one or more ranges of memory addresses of the second replica has been modified while the first replica is unavailable (406). For example, an application that uses the object may write data to the one or more memory addresses of the object. In turn, the system may copy the data to the same one or more memory addresses of the second replica.

The system updates, for each particular range of memory address of the one or more ranges of memory addresses of the second replica, the respective bit of the second tracking bitmap for the particular range of memory addresses to indicate that the particular range of memory addresses has been modified (408). For example, the system may send a request to the host of the second replica in response to determining that the data of the particular range of memory addresses has been modified at the second replica. In turn, the host of the second replica can update the appropriate bit of the second tracking bitmap to indicate that the bit's respective range of memory addresses has been modified.

When the first replica becomes available again, the system can update the resyncing bitmap for the first replica using the second tracking bitmap, as described above. The system can then use the updated resyncing bitmap to copy data from the second replica, or another replica of the object, to the first replica. If, during this resynchronization process, the first replica becomes unavailable again, the system can generate and maintain a third tracking bitmap to track ranges of memory addresses of the object that are modified while the first replica is unavailable this time.

Embodiments of the subject matter and the operations described in this document can be implemented in digital electronic circuitry, or in computer software, firmware, or hardware, including the structures disclosed in this document and their structural equivalents, or in combinations of one or more of them. Embodiments of the subject matter described in this document can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this document can be implemented as operations performed by a data processing apparatus on data stored on one or more computer-readable storage devices or received from other sources. The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this document can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this document can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this document, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this document contains many specific implementation details, these should not be construed as limitations on the scope of any inventions or of what may be claimed, but rather as descriptions of features specific to particular embodiments of particular inventions. Certain features that are described in this document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method comprising:
   initiating a resynchronization process that resynchronizes a first replica of an object stored at a first host with a second replica of the object stored at a second host using resyncing data that indicates, for each range of memory addresses of the object, whether the range of memory addresses is synchronized at the first replica with the second replica; and
   for each instance, of multiple instances, of the first replica becoming unavailable prior to the resynchronization process being completed:
      generating, at the second host, a new set of tracking data for the first replica, the new set of tracking data indicating, for each range of memory addresses of the object, whether data stored at the range of memory addresses of the object has been modified at a second replica while the first replica was unavailable; and
      in response to determining that the first replica has become available again to a distributed storage system:

updating the resyncing data based on the new set of tracking data generated while the first replica was unavailable, comprising: updating, for each range of memory addresses of the object that the new set of tracking data indicates has been modified at the second replica while the first replica was unavailable, corresponding data of the resyncing data to indicate that a corresponding range of memory addresses of the first replica is not synchronized with the second replica of the object, while not updating, for each range of memory addresses of the object that the new set of tracking data indicates has not been modified at the second replica while the first replica was unavailable, corresponding data of the resyncing data, and resuming the resynchronization process using the updated resyncing data, including copying, from the second host to the first host and based on the updated resyncing data, data of one or more ranges of memory addresses of the first replica that the updated resyncing data indicates are not synchronized with the second replica of the object, wherein the new set of tracking data for at least one instance of the first replica becoming unavailable is different from the new set of tracking data for at least one other instance of the first replica becoming unavailable.

2. The method of claim 1, wherein obtaining the resyncing data comprises obtaining the resyncing data from the first host.

3. The method of claim 1, wherein data of each range of the memory addresses of the first replica that are synchronized is not copied from the second replica to the first replica.

4. The method of claim 1, wherein:
the resyncing data comprises a resyncing bitmap that includes a respective bit for each range of memory addresses of the object, each bit of the resyncing bitmap indicating whether the bit's respective range of memory addresses is synchronized at the first replica with the second replica of the object; and
each new set of tracking data comprises a tracking bitmap that includes a respective bit for each range of memory addresses of the object, each bit of the tracking bitmap indicating whether the bit's respective range of memory addresses has been modified at the second replica while the first replica was unavailable.

5. The method of claim 4, further comprising updating the resyncing bitmap based on the copying, including updating each bit of the updated resyncing bitmap for which data of the bit's respective range of memory addresses has been copied from the second replica to the first replica to indicate that data stored at the bit's respective range of memory addresses is synchronized at the first replica with the other replicas of the object.

6. The method of claim 4, further comprising associating a sequence number with each new tracking bitmap, the sequence number being based on a last write operation processed for the object before the first replica became unavailable; and
identifying the new tracking bitmap for updating the resyncing data based on the sequence number associated with each new tracking bitmap.

7. The method of claim 4, further comprising generating a respective tracking bitmap for tracking ranges of memory addresses of the object for which data are modified while the first replica is unavailable at each host of the distributed storage system that stores a replica of the object.

8. The method of claim 4, wherein updating the resyncing data based on the new set of tracking data generated while the first replica was unavailable this time comprises:
identifying, in the new tracking data, a particular bit that has been set to indicate that data stored at a particular range of memory addresses of the first replica corresponding to the particular bit has been modified since the first replica has become unavailable this time; and
setting, in the resyncing data, a corresponding bit that corresponds to the particular bit and corresponds to the particular range of memory addresses to indicate that the particular range of memory addresses of the first replica are not synchronized with the second replica.

9. The method of claim 4, wherein updating the resyncing data based on the new set of tracking data generated for an instance of the first replica being unavailable comprises:
identifying, in the new tracking data, a particular bit that has not been set to indicate that data stored at a particular range of memory addresses of the first replica corresponding to the particular bit has been modified since the first replica became unavailable;
determining that a corresponding bit of the resyncing data that corresponds to the particular bit is set to indicate that the particular range of memory addresses of the first replica are not synchronized with the second replica; and
in response to determining that the corresponding bit of the resyncing data that corresponds to the particular bit is set, determining to not reset the corresponding bit of the resyncing data.

10. The method of claim 1, wherein the object comprises at least one of a set of data, code, or an application.

11. The method of claim 1, further comprising designating the second host as an owner host of the object in response to determining that the first replica has become unavailable.

12. A system comprising:
a data processing apparatus; and
a memory apparatus in data communication with the data processing apparatus and storing instructions executable by the data processing apparatus and that upon such execution cause the data processing apparatus to perform operations comprising:
initiating a resynchronization process that resynchronizes a first replica of an object stored at a first host with a second replica of the object stored at a second host using resyncing data that indicates, for each range of memory addresses of the object, whether the range of memory addresses is synchronized at the first replica with the second replica; and
for each instance, of multiple instances, of the first replica becoming unavailable prior to the resynchronization process being completed:
generating, at the second host, a new set of tracking data for the first replica, the new set of tracking data indicating, for each range of memory addresses of the object, whether data stored at the range of memory addresses of the object has been modified at a second replica while the first replica was unavailable; and
in response to determining that the first replica has become available again to a distributed storage system:
updating the resyncing data based on the new set of tracking data generated while the first replica was unavailable, comprising: updating, for each range of memory addresses of the object that the new set of tracking data indicates has been modified at the second replica while the first replica was unavailable, corresponding data of the resyncing data to indicate that a corresponding range of memory addresses of the first replica is not synchronized with the second replica of the object, while not updating, for each range of memory addresses of the object that the new set of tracking data indicates has not been modified at the second replica while the first replica was unavailable, corresponding data of the resyncing data, and resuming the resynchronization process using the updated resyncing data, including copying, from the second host to the first host and based on the updated resyncing data, data of one or more ranges of memory addresses of the first replica that the updated resyncing data indicates are not synchronized with the second replica of the object, wherein the new set of tracking data for at least one instance of the first replica becoming unavailable is different from the new set of tracking data for at least one other instance of the first replica becoming unavailable.

13. The system of claim 12, wherein obtaining the resyncing data comprises obtaining the resyncing data from the first host.

14. The system of claim 12, wherein data of each range of the memory addresses of the first replica that are synchronized is not copied from the second replica to the first replica.

15. The system of claim 12, wherein:
the resyncing data comprises a resyncing bitmap that includes a respective bit for each range of memory addresses of the object, each bit of the resyncing bitmap indicating whether the bit's respective range of memory addresses is synchronized at the first replica with the second replica of the object; and each new set of tracking data comprises a tracking bitmap that includes a respective bit for each range of memory addresses of the object, each bit of the tracking bitmap indicating whether the bit's respective range of memory addresses has been modified at the second replica while the first replica was unavailable.

16. The system of claim 15, wherein the operations comprise updating the resyncing bitmap based on the copying, including updating each bit of the updated resyncing bitmap for which data of the bit's respective range of memory addresses has been copied from the second replica to the first replica to indicate that data stored at the bit's respective range of memory addresses is synchronized at the first replica with the other replicas of the object.

17. The system of claim 15, wherein the operations comprise associating a sequence number with each new tracking bitmap, the sequence number being based on a last write operation processed for the object before the first replica became unavailable; and
identifying the new tracking bitmap for updating the resyncing data based on the sequence number associated with each new tracking bitmap.

18. The system of claim 15, wherein the operations comprise generating a respective tracking bitmap for tracking ranges of memory addresses of the object for which data are modified while the first replica is unavailable at each host of the distributed storage system that stores a replica of the object.

19. The system of claim 15, wherein updating the resyncing data based on the new set of tracking data generated for an instance of the first replica being unavailable comprises:
identifying, in the new tracking data, a particular bit that has been set to indicate that data stored at a particular range of memory addresses of the first replica corresponding to the particular bit has been modified since the first replica became unavailable; and
setting, in the resyncing data, a corresponding bit that corresponds to the particular bit and corresponds to the particular range of memory addresses to indicate that the particular range of memory addresses of the first replica are not synchronized with the second replica.

20. A computer storage medium encoded with a computer program, the program comprising instructions that when executed by data processing apparatus cause the data processing apparatus to perform operations comprising:
initiating a resynchronization process that resynchronizes a first replica of an object stored at a first host with a second replica of the object stored at a second host using resyncing data that indicates, for each range of memory addresses of the object, whether the range of memory addresses is synchronized at the first replica with the second replica; and for each instance, of multiple instances, of the first replica becoming unavailable prior to the resynchronization process being completed:
generating, at the second host, a new set of tracking data for the first replica, the new set of tracking data indicating, for each range of memory addresses of the object, whether data stored at the range of memory addresses of the object has been modified at a second replica while the first replica was unavailable; and in response to determining that the first replica has become available again to a distributed storage system:
updating the resyncing data based on the new set of tracking data generated while the first replica was unavailable, comprising: updating, for each range of memory addresses of the object that the new set of tracking data indicates has been modified at the second replica while the first replica was unavailable, corresponding data of the resyncing data to indicate that a corresponding range of memory addresses of the first replica is not synchronized with the second replica of the object, while not updating, for each range of memory addresses of the object that the new set of tracking data indicates has not been modified at the second replica while the first replica was unavailable, corresponding data of the resyncing data, and resuming the resynchronization process using the updated resyncing data, including copying, from the second host to the first host and based on the updated resyncing data, data of one or more ranges of memory addresses of the first replica that the updated resyncing data indicates are not synchronized with the second replica of the object, wherein the new set of tracking data for at least one instance of the first replica becoming unavailable is different from the new set of tracking data for at least one other instance of the first replica becoming unavailable.

* * * * *